March 8, 1960 — R. C. RENICK ET AL — 2,928,045
SIGNAL DECODER

Filed Sept. 20, 1957 — 5 Sheets-Sheet 1

Fig.1

Inventors
ROBERT C. RENICK
HAROLD J. MILLS
By Alfred C. Hill
Agent

United States Patent Office 2,928,045
Patented Mar. 8, 1960

2,928,045

SIGNAL DECODER

Robert C. Renick, Plainfield, and Harold J. Mills, Clifton, N.J., assignors to International Telephone and Telegraph Corporation, Nutley, N.J., a corporation of Maryland Application September 20, 1957, Serial No. 685,330

20 Claims. (Cl. 324—68)

This invention relates to a system for measuring the time spacing between signal pulses by counting clock pulses.

Intelligence of one type or another may be sampled at set intervals and the sampled intelligence transmitted to a receiving terminal by various forms of pulse modulation, such as pulse amplitude modulation, pulse width modulation, pulse code modulation, and pulse time modulation. The arrangement of this invention is particularly unique to one form of pulse time modulation wherein the time spacing between two pulses of a pair is varied proportional to the sampled intelligence with at least the first pulse of each pair being varied in time. In this type of pulse time modulation, the time spacing between pulses of a pulse pair may be demodulated or decoded by several different methods to recover the intelligence transmitted. One of the decoding methods accurately measures the time spacing between the leading edges of two pulses of a pulse pair by counting the number of locally generated clock pulses that occur between the leading edges of these two pulses. Previous decoders for this latter type of pulse time modulation have employed the first pulse of the received pulse pair to start a counter which counts the internally generated clock pulses while the second pulse of the received pulse pair stopped the counter. The value of the counts in the counter was a measure of the time spacing between the two pulses of the pulse pair. Since both pulses of the received pulse pair can occur in random time relation with respect to the timing of the internally generated clock pulses, it is possible with the prior art arrangement for a slight time shift of less than a full clock interval (the time interval between adjacent clock pulses) to appear as a double clock pulse change. In other words, the resulting count of the clock pulses between the pulses of a pulse pair would be in error by an extra counted clock pulse.

Therefore, it is an object of this invention to provide an improved system for measuring the time spacing between signal pulses by counting clock pulses.

Another object of this invention is to reduce the error in the resulting count produced by a system for measuring the time spacing between signal pulses by counting clock pulses.

Still another object of this invention is to provide a system for measuring the time spacing between signal pulses by counting clock pulses resulting in a count that has an error no greater than one counted clock pulse.

A feature of this invention is the provision of a means responsive to the time relation between a first of the signal pulses and a time adjacent clock pulse for delaying a following signal pulse by at least one of a number of predetermined amounts and a means for counting a number of successive clock pulses between the time position of said first of the signal pulses and the first of the delayed signal pulses.

Another feature of this invention is the provision of means for imparting the greatest time delay to a following signal pulse when the greatest time spacing exists between a first of the signal pulses and the first counted clock pulse and the smallest time delay to the following signal pulse when the smallest time spacing exists between the first of the signal pulses and the first counted clock pulse.

Still another feature of this invention is the provision of a means responsive to the clock pulses and a first of the signal pulses to determine the time position of the first of the signal pulses in one of the clock pulse intervals and to select at least one of a number of predetermined time delays in accordance with the determined time position of the first of the signal pulses for delaying a following signal pulse the selected amount. A counter is provided to count the clock pulses between the first of the signal pulses and the first of the delayed following signal pulses.

A further feature of this invention is the provision of a plurality of normally non-conductive paths, means to delay the second pulse of a pulse pair a plurality of different predetermined amounts, means coupling each of the delayed second pulses to predetermined ones of said paths, means to sequentially couple each of the clock pulses to each of said paths, and means to couple the first pulse of the pulse pair simultaneously to said paths, the time coincidence of the clock pulse and the first pulse of the pulse pair rendering at least one of said paths conductive to pass at least one of the delayed second pulses to the output of the conductive path. A clock pulse counter is employed to count the clock pulses between the first pulse of the pulse pair and the first output pulse of the conductive paths.

The above-mentioned and other objects and features of this invention will become more apparent by reference to the following description taken in conjunction with the accompanying drawings, in which:

Figure 1:
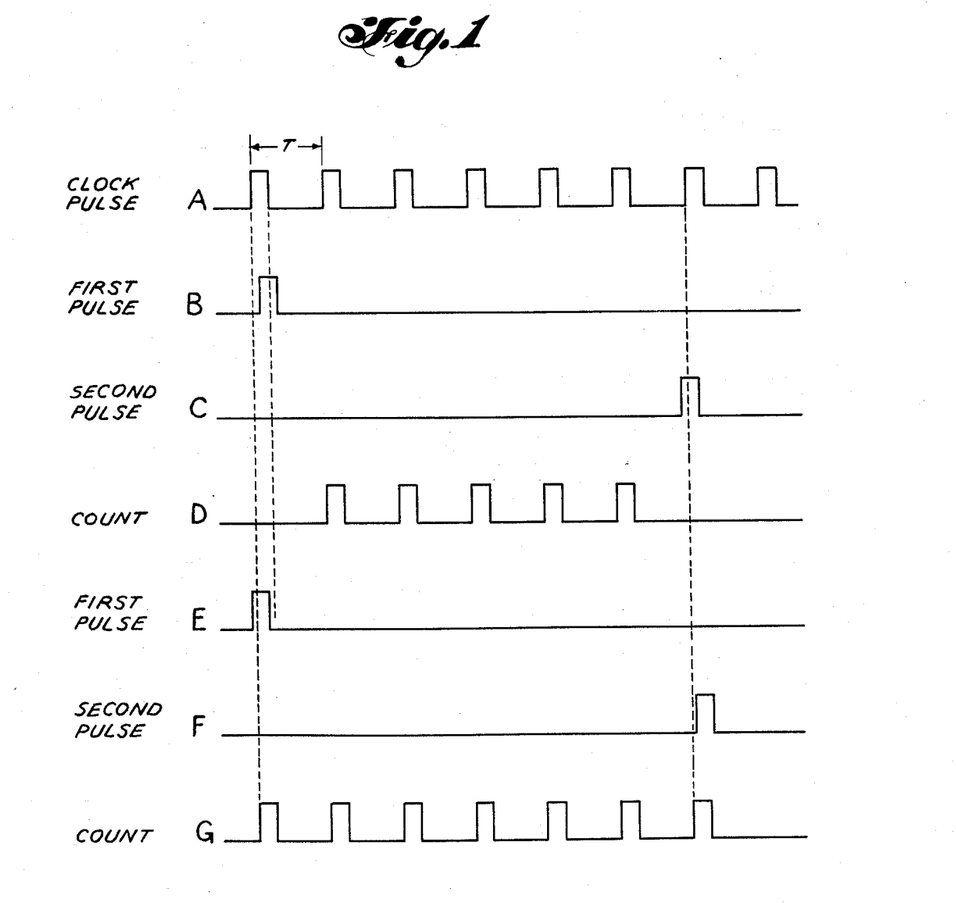
Fig. 1 is a timing diagram illustrating the error present in decoding systems of the prior art.

Referring to Fig. 1, a timing diagram is illustrated to further point out in pictorial form the counting error that is present in the prior art arrangements for measuring the time spacing between a pair of signal pulses by counting clock pulses therebetween. Curve A illustrates the clock pulses that are generated internally of a receiving station or terminal having a definite repetition frequency and hence a timing interval, T, therebetween. To accurately measure the time spacing between a first and second received pulse, such as the pulses of a pulse pair, it is necessary for the counter to count the clock pulses occurring between the two received pulses. Curve B illustrates the time position of a first received pulse with respect to a clock pulse of curve A. Curve C illustrates the second received pulse in a particular time relationship to the first received pulse and another of the clock pulses of curve A. A counter for counting the clock pulses of curve A is started by the first received pulse, the pulse of curve B, and would then be stopped by the occurrence of the second pulse, the pulse of curve C. This would result in a count of five as represented in curve D.

Due to the intelligence being carried by the time spacing of the first and second pulses, these pulses can be shifted a very slight amount as illustrated in curves E and F, Fig. 1 and can assume the illustrated relationship with the clock pulses of curve A. The time shift of these two pulses is much less than the time interval T of the clock pulses of curve A. The same process of starting and stopping a counting operation results in a count of seven as depicted in curve G. Obviously, for a change considerably less than T, there should not be a change in the count by two. It is obvious, therefore, that the count depicted in curve G is in error by an extra clock pulse and hence would give the wrong measure of time spacing between the two signal pulses and, in turn, the intelligence would not be properly decoded or demodulated.

Figure 2:
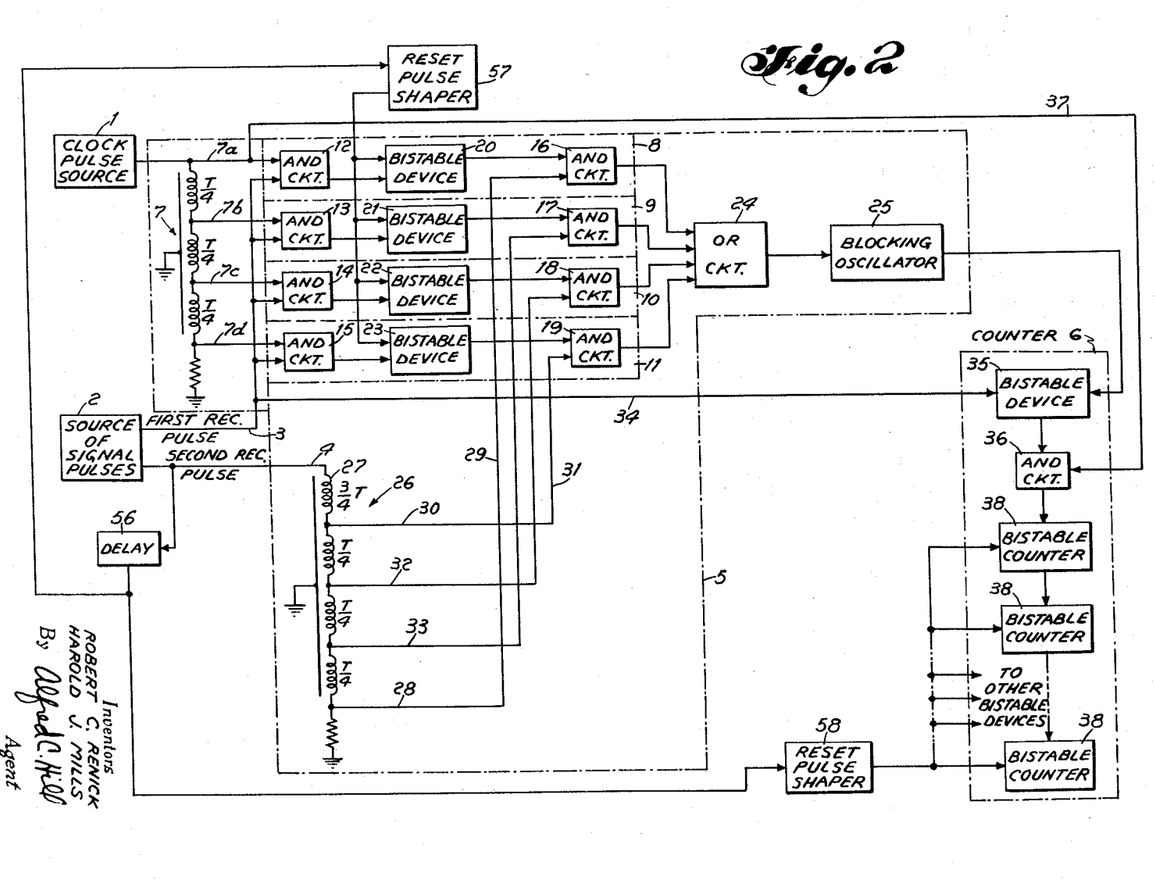
Fig. 2 is a schematic diagram in block form of an embodiment following the principles of this invention.

It has been found that the counting error as depicted in Fig. 1 can be reduced an appreciable amount by employing the system described herein, an embodiment of which is illustrated in Fig. 2. The system is so arranged that the closest clock pulse to the received pulses is, in effect, included in the count and thereby reduces the counting error present in the prior art arrangement. The improved system for measuring the time spacing between signal pulses by counting clock pulses includes a clock pulse source 1 and a source of signal pulses 2 which may be a terminal receiver having means therein to separate a first received pulse for transmission over conductor 3 and a second received pulse for transmission over conductor 4. The system further broadly includes means responsive to the time relation between a first of the signal pulses and a time adjacent clock pulse for delaying a signal pulse at least one of a number of predetermined amounts, generally identified in Fig. 2 by reference character 5, and a means for counting a number of successive clock pulses determined by the time position of the first signal pulse and the first of the delayed signal pulses, indicated generally by counter 6. Means 5 includes a delay line 7 having a plurality of output taps therealong to delay a clock pulse for occurrence in subdivisions of the time interval between adjacent clock pulses. The embodiment of Fig. 2 used for the purposes of explanation illustrates that the clock pulse time interval is subdivided into four parts. It is to be understood, however, that the clock pulse time interval could be divided into any desired number of subdivisions with the increase in subdivisions reducing the error of the measuring system.

The output of the delay line taps 7a to 7d are coupled to normally non-conductive paths 8, 9, 10, and 11 in a manner whereby path 8 receives a clock pulse of source 1 which experiences no delay time, conductive path 9 receives a clock pulse having a time delay of $T/4$, path 10 receives a clock pulse having a time delay of $T/2$, and conductive path 11 receives a clock pulse having a time delay of $3T/4$. Each of the normally non-conductive paths 8 to 11 includes as components thereof a coincidence device indicated respectively as logical "AND" circuits 12, 13, 14, 15, a coincidence device illustrated to be logical "AND" circuits 16, 17, 18, and 19, respectively, interconnected by bistable devices 20, 21, 22, and 23, respectively. Bistable devices 20 to 23 may be bistable devices, such as Eccles-Jordan type multivibrators.

The output of normally non-conductive paths 8 to 11 are coupled in common to a logical "OR" circuit 24 which will pass the output of either or all of the normally non-conductive paths 8 to 11 if there is an output from these paths. The output of the OR circuit 24 is coupled to a blocking oscillator 25 to provide a reshaped pulse for utilization in counter 6.

As illustrtaed in Fig. 2, the first received pulse of source 2 is coupled over conductor 3 for simultaneous application to the AND circuits 12 to 15, respectively, of normally non-conductive paths 8 to 11. Delay line 7 sequentially applies a clock pulse of source 1 to the AND circuits 12, 13, 14, and 15, respectively, of normally non-conductive paths 8, 9, 10, and 11.

The second received pulse output of source 2 is coupled by means of conductor 4 to delay line 26 which includes therealong a plurality of delay taps spaced by predetermined different delay times to provide predetermined different delays for the second received pulse. As depicted in the illustration of Fig. 2, the first delay section 27 has a delay equal to $3T/4$, while the remaining delay sections of delay line 26 have a time delay equal to $T/4$, the same delay experienced by the clock pulse to occur in the subdivisions of the time interval T. The greatest delayed second pulse, the output of tap 28, is coupled by means of conductor 29 to AND circuit 16 of normally non-conductive path 8. The least delayed second pulse, the output of tap 30, is coupled by means of conductor 31 to the AND circuit 19 of non-conductive path 11. The output of tap 32, the next largest delay for the second received pulse, is coupled to AND circuit 17 of normally non-conductive path 9 and the output of tap 33, the next largest for the second received pulse, is coupled to AND circuit 18 of normally non-conductive path 10. It will be observed that non-conductive path 8 has coupled thereto the clock pulses experiencing the smallest time delay and the second received pulse experiencing the largest time delay and non-conductive path 11 has coupled thereto the clock pulse experiencing the largest time delay and the second received pulse experiencing the smallest time delay. The intermediate normally non-conductive paths receive delay clock pulses in sequentially increasing order of delay amounts and delayed second received pulse in sequentially decreasing order of delay amounts. It is this arrangement of connections of delayed pulses to the non-conductive paths 8 to 11 which enables the selection of the largest delayed second received pulse when the time spacing between the first of the signal pulses and the next adjacent clock pulse is the greatest and the smallest delayed second pulse when the smallest time spacing exists between the first of the signal pulses and the next adjacent clock pulses. It is these connections to paths 8 to 11 of the delayed clock and second received pulses that make it possible to shift the second received pulse in time a selected amount to assure that sufficient clock pulses are included in the count to account for the preceding clock pulse when the first received pulse occurs in the first half of the clock pulse time interval and the following clock pulse when the second received pulse occurs in the last half of the clock pulse time interval.

The first received pulse output of source 2 is also coupled by means of conductor 34 to a bistable device 35 disposed in counter 6. The operation of the first pulse coupled over conductor 34 to bistable device 35 is to trigger the bistable device into one condition of stability which produces an output therefrom. This output is coupled to AND circuit 36 which readies AND circuit 36 to pass the pulses coupled from clock pulse source 1 by means of conductor 37. Thus, the clock pulses on conductor 37 are passed through AND circuit 36 to any known chain of bistable counters 38, the conduction condition of each counter indicating the number of pulses which have been applied thereto. The counting operation will commence when the first received pulse is applied to bistable device 35 and will continue until there is an output delivered from blocking oscillator 25 to bistable device 35 to trigger this device into its other stable condition which produces no output. This operation or triggering of device 35 to its no output condition will cause the AND circuit 36 to block the clock pulses and hence stop the counting of counters 38. The number of clock pulses that have occurred between the first received pulse and a delayed second received pulse will then be indicated on counters 38. It is then merely necessary to read the count established on counters 38 to measure the time spacing between the first and second signal pulses. In the arrangement indicated, the count error is not completely eliminated since there is a possibility of a maximum error in the count of one clock pulse interval. It will be recognized, however, that this error reduction results in a count which is much better than the previous counting arrangements employed in the prior art which gave a count error of two clock intervals.

The description relative to Fig. 2 has set forth the structural organization of the system for measuring the time spacing between signal pulses by counting clock pulses which will reduce the error of the count previously obtained in the prior art arrangements. To facilitate the understanding of this invention, three timing conditions of the pulses of the pulse pairs are shown in the timing diagram of Figs. 3, 4, and 5 and will be discussed in connection with the operation of the system of Fig. 2.

Figure 3:
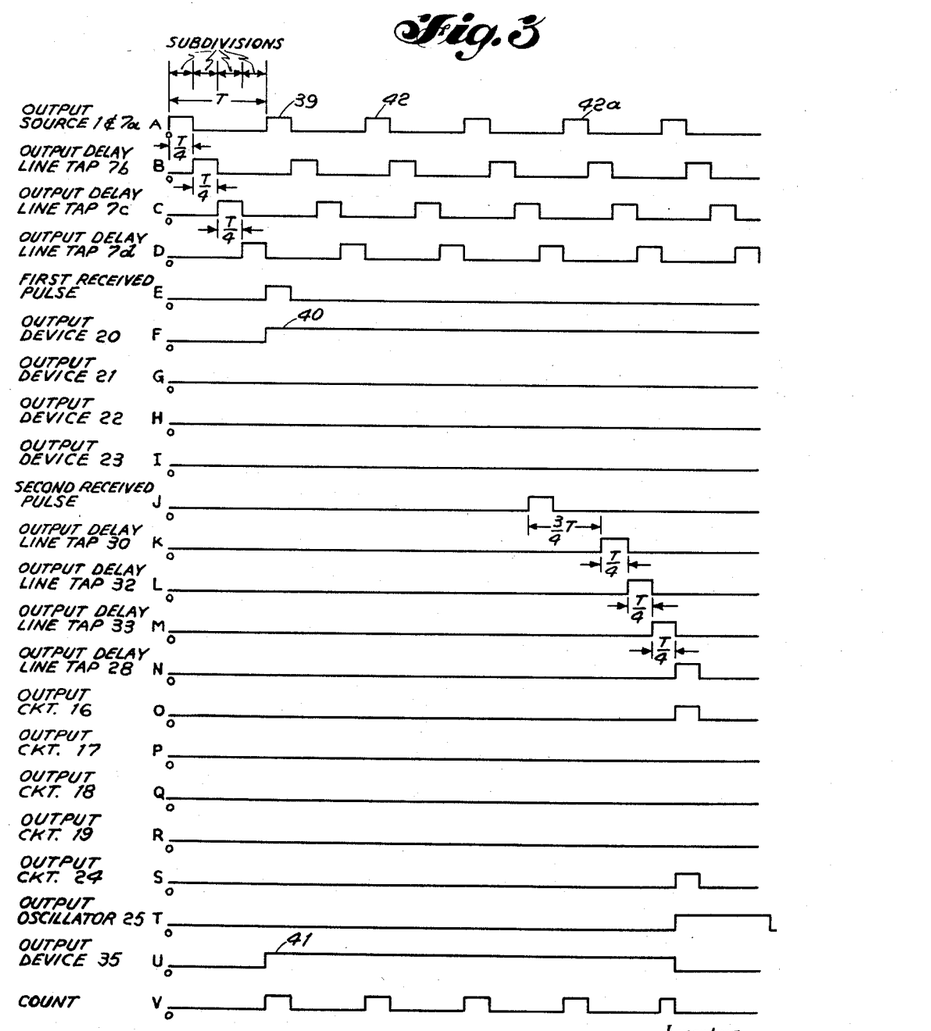
Figs. 3, 4, and 5 are timing diagrams useful in explaining the operation of the system of Fig. 2 for three different time positions of the pulses of a pulse pair.

Referring to Figs. 2 and 3, it will be observed that the output of source 1, as represented by curve A, has a particular time interval between adjacent clock pulses indicated as T. It is proposed in this system that this clock interval be subdivided into subdivisions of a predetermined number. As pointed out hereinabove for purposes of illustration, the time interval between adjacent clock pulses has been divided into four subdivisions with the understanding that the clock pulse interval can be divided into more than four subdivisions with an increasing reduction in the counting error. It will be further observed that the width of the clock pulse is approximately equal to the time of a subdivision; hence, a subdivision is one quarter T, and the width of a clock pulse is also approximately one quarter T. Before continuing with the operation of the circuit of Fig. 2, it will be observed that the first received pulse illustrated in curve E and the second received pulse illustrated in curve J have three clock pulses therebetween. It is desired by this system that the count be such that the closest clock pulse to the received pulses be counted to give a more accurate measurement of the time spacing between the pulses of a pulse pair. Thus, to be more accurate due to closeness of the second received pulse to clock pulse 42a, the system should count four clock pulses. This, in itself, will introduce a slight error but is of course less than the error introduced if this closest clock pulse is not read. Hence, if a signal pulse occurs between 0 and $T/2$, it is desired that the preceding clock pulse be read. If, however, the signal pulse occurs between $T/2$ and T, it is desirable that the following clock pulse be counted which gives a more accurate indication of the time spacing between the pulses of a pulse pair.

The output of source 1, the clock pulses, are coupled directly to AND circuit 12 by delay line tap 7a, the output of delay line tap 7b, curve B, Fig. 3, is coupled to the AND circuit 13, the output of delay line tap 7c is coupled to AND circuit 14 having a time displacement illustrated in curve C, and the output of delay line tap 7d having a displacement as illustrated in curve D is coupled to AND circuit 15. This arrangement of delay line 7 and the coupling of the taps thereto provided for the sequential application of a clock pulse to normally non-conductive paths 8, 9, 10, and 11 through the means of the AND circuits 12, 13, 14, and 15. The first received pulse output of source 2 is coupled over conductor 3 to AND circuits 12, 13, 14, and 15 simultaneously and has a timing relative to clock pulses of curves A, B, C, and D as illustrated in curve E, Fig. 3. It will be observed that the first received pulse of curve E is coincident in time with the pulse 39 of curve A, the clock pulse appearing and occupying the first subdivision of the clock pulse interval. This time coincidence between the first received pulse and clock pulse 39 will take place in AND circuit 12 and of course will open the AND circuit 12 to allow an output therefrom for triggering bistable device 20 from its condition of no output to its stable condition of output as indicated by pulse 40, curve F, Fig. 3. Since the first received pulse was not coincident with any of the other subdivision or vernier pulses from the outputs of taps 7b, 7c, and 7d of delay line 7, the AND circuits 13, 14, and 15 will remain in the closed or non-conductive position, and hence the bistable devices 21, 22, and 23 will remain in their stable condition of no output. This is illustrated in curves G, H, and I, Fig. 3.

The second received pulse is coupled over conductor 4 to delay line 26. This second received pulse is indicated in curve J, Fig. 3. The delay line 26 produces, respectively, at taps 30, 32, 33, and 28 delayed second pulses having a predetermined amount of delay. These delayed second pulse outputs from delay line taps 30, 32, 33 and 28 are fixedly coupled to AND circuits 19, 18, 17, and 16, respectively, thereby applying the second received pulse with the lowest delay to AND circuit 19 and the second pulse with the highest delay to AND circuit 16 with the intermediate AND circuits 17 and 18 having applied thereto the second pulse of different time delays of intermediate and successive relationship with the delayed signals applied to AND circuits 16 and 19. This prearranged connection of the output taps of delay line 26 to the appropriate and selected AND circuits of normally non-conductive paths 8, 9, 10, and 11 effectively has the following function. The second received pulse delayed the least amount coupled from delay line tap 30 looks at AND circuit 19 and sees that the AND circuit is blocked to it and, therefore, no output results. This is illustrated in curve R, Fig. 3. The next largest delayed second received pulse at the output of delay line tap 32 looks at AND circuit 18 and again finds this normally non-conductive path component 10 blocked to it and, hence, no output can be derived from 18. This is illustrated in curve Q, Fig. 3. The next largest delayed second received pulse coupled from output tap 33 looks at AND circuit 17 in normally non-conductive path 9 and finds this AND circuit blocked preventing its passage to the output which is illustrated in curve P, Fig. 3. However, when the next largest delayed second received pulse at the output of 28 is coupled to AND circuit 16, it is found that AND circuit 16 is open and can pass to the output thereof. This is illustrated in curve O, Fig. 3. The output of AND circuit 16 is coupled to the OR circuit 24 which passes to its output the pulse indicated in curve S, Fig. 3. This pulse output triggers blocking oscillator 25 to produce a pulse as indicated in curve T, Fig. 3. As pointed out hereinabove, the first received pulse is conducted over line 34 to trigger bistable device 35 into a stable condition producing an output pulse 41, curve U, Fig. 3. It will be noted that time coincidence is present between the leading edge of pulse 41 and the leading edge of the first received pulse, curve E, Fig. 3. The triggering of bistable device 35 to its output condition opens the AND circuit 36 to permit the clock pulses coupled over 37 to appear at the output of circuit 36 for counting thereof, the count being illustrated in curve V, Fig. 3. Device 35 is returned to its no output condition by the application of the output of blocking oscillator 25 as illustrated by the time coincidence of the leading edge of the output of curve T, Fig. 3, and the trailing edge of pulse 41, curve U, Fig. 3. This application of the output of oscillator 25 stops the counting process in counter 38 and renders a count of five as depicted in curve V, Fig. 3. If the count of the original first received and second received pulse of curves E and J are compared with respect to the output of source 1, curve A, Fig. 3, it will be observed that the count should have been four and not five. The illustration in this timing diagram of Fig. 3 represents the maximum counting error that can be experienced with the system of Fig. 2. It is obvious that this error of one count is still better than the error of two counts which was obtained with the prior art arrangements.

It will be observed in connection with Fig. 3 that there exists the greatest spacing between the first received pulse and the first clock pulse that should have been counted, pulse 42, curve A, Fig. 3. This spacing between the first received pulse and the next adjacent clock pulse resulted in the maximum time delay to the following or second received pulse. This assures that the second received pulse has sufficient delay to assure that that number of pulses are counted to make up for the proximity of the first received pulse to a preceding clock pulse, which under the conditions specified above, assures that this clock pulse is read.

It will further be noted that the first delay section of delay line 26 has a delay equal to 3/4T, while the remaining delay sections have a time delay equal to the time of the subdivisions, in other words, T/4. This 3/4 time delay is important and is the minimum time delay that the second received pulse should experience. This follows from the fact that if the first pulse is just in the fourth subdivision of a clock pulse time interval and it is desired that the clock pulse of the next interval be read, this gives a delay of T/4 that should be imparted to the second pulse. Now, if the second pulse is just within the third subdivision of a time interval, it is desirable that the following clock pulse be read to give an accurate measure of the time spacing since the second pulse is closer to the following clock pulse than the preceding one. This would therefore result in a delay of T/2 to assure that the following clock pulse is read. Therefore, to assure the proper count in accordance with the principles of this invention, the minimum time delay that can be experienced by the following signal pulse is 3T/4 due to the time relation between the first pulse in the fourth subdivision of a time interval and a second pulse being located just in the third subdivision of a time interval. This minimum delay is necessary regardless of the number of subdivisions as long as it is desired to read to the closest clock pulse in relationship to the signal pulses. If the subdivisions are increased, the first or minimum delay of line 26 should be 3/4T, and the other delay sections would be equal to the time of a subdivision. The maximum delay will increase as the clock pulse time interval is subdivided into smaller and smaller increments. This is illustrated by the following examples. Assume that the clock pulse time interval is divided into eight subdivisions. The delay necessary for delay line 7 would be 3/4T+seven 1/8T delay sections, resulting in a total time delay or maximum time delay of 13/8T. If it is desired to subdivide the clock pulse time interval by sixteen subdivisions, it will be recognized that the minimum time delay or first section will have a delay of 3/4T, while the remain relay sections will have a time delay of 1/16 per section, resulting in a maximum time delay of 27/16T. If the subdivision of a time interval between adjacent clock pulses is carried to smaller and smaller increments, it will be recognized that the maximum time delay experienced by the second received pulse approaches a delay of 2T.

Figure 4:
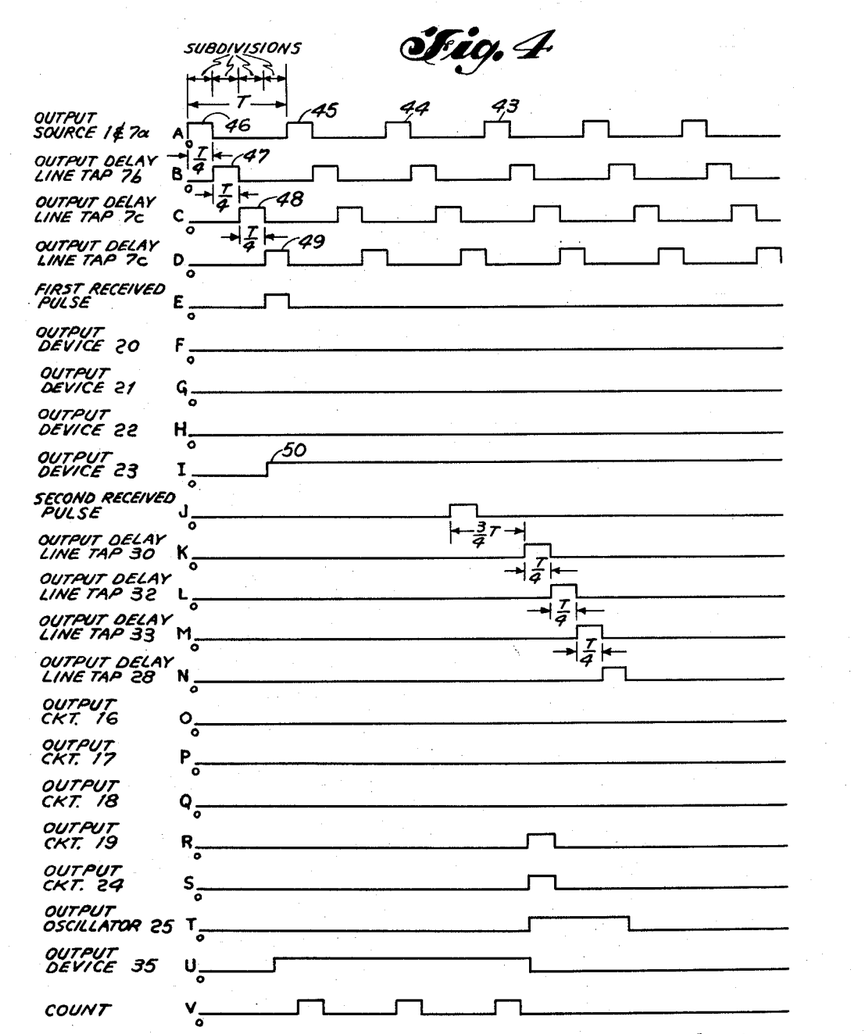

Referring to Fig. 4, there is illustrated therein another condition of different time spacing of the first and second received pulses. It will be observed that the first pulse, curve E, Fig. 4, occurs in the fourth subdivision of the time interval T and that the second received pulse straddles the third and fourth subdivision of the clock pulse time interval. Due to the time spacing, the correct count of the circuit of the system of this invention should be three since the second received pulse is closer to clock pulse 43 than it is to clock pulse 44, and the first received pulse occurs prior to the clock pulse 45. As described in connection with Fig. 3, the output of clock pulse source 1, curve A, Fig. 4, sequentially samples the normally non-conductive paths 8, 9, 10, and 11 through the medium of AND circuits 12, 13, 14, and 15, while the first received pulse is coupled over conductor 3 simultaneously to AND circuits 12, 13, 14, and 15. Since the subdivision or vernier clock pulses 46, 47 and 48 are not time coincident with the first received pulse of curve E, Fig. 4, AND circuits 12, 13, 14 will maintain paths 8, 9, and 10 in the non-conductive state. However, time coincidence occurs between the vernier pulse 49 and the first received pulse of curve E, Fig. 4. This means that bistable devices 20, 21, 22 remain in their stable condition of no output, while bistable device 23 will be flipped from its stable condition of no output to its stable condition of output as indicated by the pulse 50 of curve I, Fig. 4. The output of bistable device 23 now readies or conditions AND circuit 19 for passage of the predetermined delayed second pulse which is the output of delay line tap 30 as depicted in curves K and R, Fig. 4. The output of AND circuit 19 produces an output from OR circuit 24 which triggers the blocking oscillator 25 to stop the counting process in counter 6 which was started by the first received pulse as indicated in curve U, Fig. 4. The resulting count of counter 6 is three, the correct count as indicated above. It will be observed from reviewing Figs. 3 and 4 that the time position of the second received pulse has no effect whatsoever upon the delay imparted thereto. The first received pulse is the controlling pulse in this system and is such that the time relationship between the first received pulse and a time adjacent clock pulse determines the predetermined delay that is imparted to the following or second pulse. The normally non-conductive paths 8, 9, 10, and 11 act as channeling means for the differently delayed second received pulse such that the properly delayed second received pulse is passed to the output to stop the counting of counter 6 and hence produce a more accurate count or measure of the time spacing between the first and second received pulses.

Figure 5:
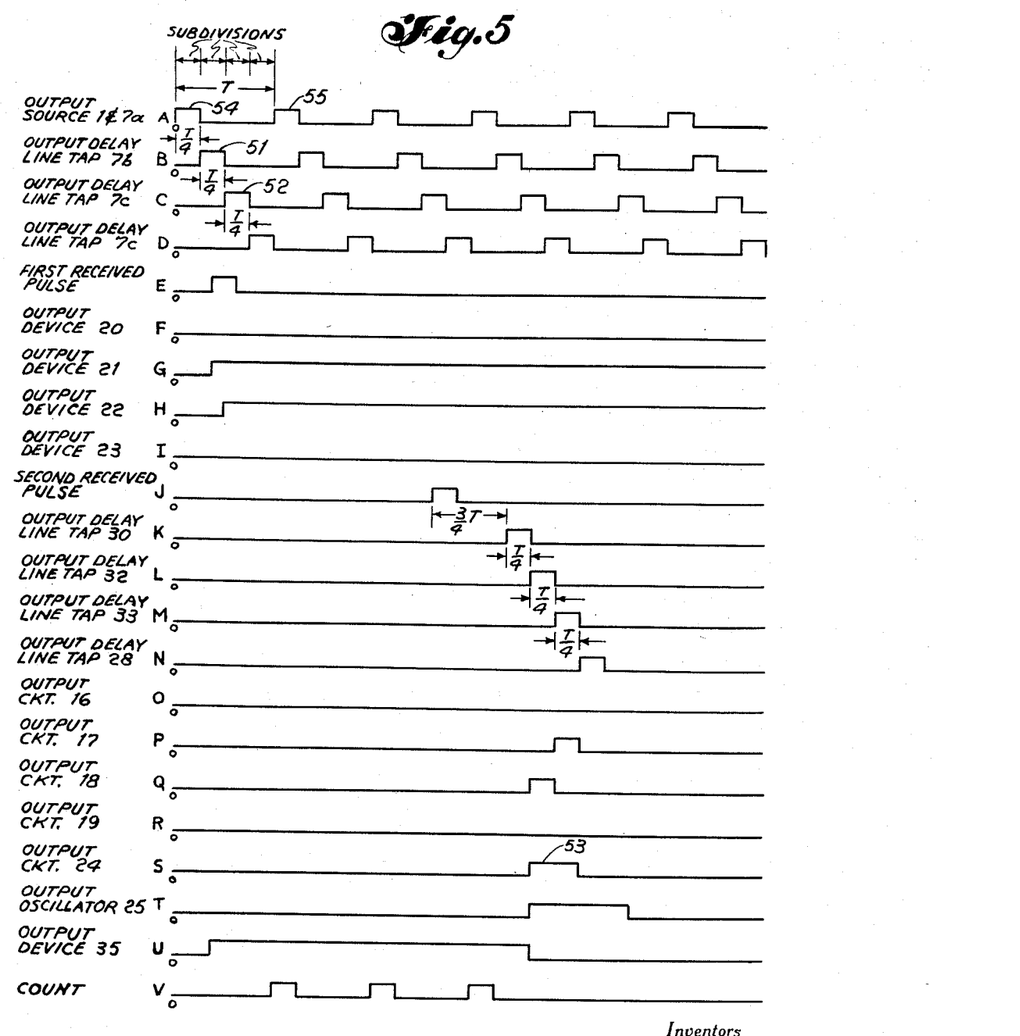

The timing diagram of Fig. 5 illustrates that the first received pulse straddles two subdivisions, namely, the second and third subdivisions of the clock pulse interval. The following discussion will illustrate how the system of Fig. 2 operates under these conditions. As the clock pulses of source 1 simultaneously sample the presence of the first received pulse in AND circuits 12, 13, 14, and 15, it is found that coincidence occurs between the first received pulse and vernier pulses 51 and 52 thereby producing output from bistable devices 21 and 22 which conditions AND circuits 17 and 18 for passage of the outputs of delay line taps 32 and 33 of delay line 26. Hence, as illustrated in curves P and Q, Fig. 5, we have outputs from AND circuits 17 and 18 with the output from AND circuit 18 preceding in time the output from the AND circuit 17. These outputs are the only outputs from the normally non-conductive paths 8, 9, 10, and 11 and are coupled to OR circuit 24 wherein an output pulse 53 is produced which has a width corresponding to the width of both the outputs from AND circuits 17 and 18. The leading edge of the output of OR circuit 24 triggers the blocking oscillator 25 and hence the leading edge of the output of oscillator 25 stops the counting process originally initiated by the first received pulse in counters 6 producing a count therein of three. Hence, this demonstrates that, while the timing diagram illustrates that there are only two clock pulses between the first received pulse and the second received pulse, we get a count of three since the first received pulse is closer to clock pulse 54 than it is to clock pulse 55 and, hence, we derive a more accurate measure of the time spacing between the two received first and second pulses.

Referring again to Fig. 2, it will be observed that the output of source 2, labeled second received pulse, is coupled to a delay line 56, the output of which is coupled to a reset pulse shaper 57 and a reset pulse shaper 58. The output of these repulse shapers is coupled respectively to bistable devices 20 to 23 and bistable counters 38 to assume that the bistable devices are in their proper starting condition, hence, in the stable condition of no output after the cycle of measuring the time spacing between two signal pulses is completed to ready these circuits for measuring the time spacing between the next two signal pulses.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system for measuring the time spacing between signal pulses by counting clock pulses comprising a source of clock pulses, a source of signal pulses, means coupled to said source of clock pulses and said source of signal pulses responsive to the time relation between a first of said signal pulses and a time adjacent clock pulse for delaying a second signal pulse following said first signal pulse by at least one of a number of predetermined amounts, and means coupled to said source of clock pulses for counting a number of successive clock pulses determined by the time position of said first pulse and the first of said delayed second signal pulses.

2. A system for measuring the time spacing between signal pulses by counting clock pulses comprising a source of clock pulses, a source of signal pulses, means coupled to said source of clock pulses and said source of signal pulses responsive to the time relation between a first of said signal pulses and a time adjacent clock pulse for delaying a second signal pulse following said first signal pulse by at least one of a number of predetermined amounts, and means coupled to said source of clock pulses and responsive to said first of said signal pulses and the first of said delayed signal pulses for counting the clock pulses between said first signal pulse and the first of said delayed second signal pulses.

3. A system for measuring the time spacing between signal pulses by counting clock pulses comprising a source of clock pulses, a source of signal pulses, means coupled to said source of clock pulses and said source of signal pulses responsive to the time relation between a first of said signal pulses and a time adjacent clock pulse for delaying a second signal pulse following said first signal pulse by one of a number of predetermined amounts, and means coupled to said source of clock pulses for counting a number of successive clock pulses determined by the time position of said first signal pulse and said delayed second signal pulse.

4. A system for measuring the time spacing between signal pulses by counting clock pulses comprising a source of clock pulses, a source of signal pulses, means coupled to said source of clock pulses and said source of signal pulses responsive to the time relation between a first of said signal pulses and a time adjacent clock pulse for delaying a second signal pulse following said first signal pulse by one of a number of predetermined amounts, and means coupled to said source of clock pulses and responsive to said first of said signal pulses and said delayed signal pulse for counting the clock pulses between said first signal pulse and said delayed second signal pulse.

5. A system for measuring the time spacing between signal pulses by counting clock pulses comprising a source of clock pulses, a source of sequential signal pulses, means coupled to said source of clock pulses and said source of signal pulses responsive to the time relation between a first of said signal pulses and a time adjacent clock pulse for delaying the next adjacent signal pulse by at least one of a number of predetermined amounts, and means coupled to said source of clock pulses for counting a number of successive clock pulses determined by the time position of said first signal pulse and the next adjacent one of said delayed signal pulses.

6. A system for measuring the time spacing between signal pulses by counting clock pulses comprising a source of clock pulses, a source of sequential signal pulses, means coupled to said source of clock pulses and said source of signal pulses responsive to the time relation between a first of said signal pulses and a time adjacent clock pulse for delaying the next adjacent signal pulse by one of a number of predetermined amounts, and means coupled to said source of clock pulses and responsive to said first of said signal pulses and said delayed signal pulse for counting the clock pulses between said first signal pulse and said delayed signal pulse.

7. A system for measuring the time spacing between signal pulses by counting clock pulses comprising a source of clock pulses, a source of signal pulses, means coupled to said source of clock pulses and said source of signal pulses responsive to the time relation between a first of said signal pulses and a time adjacent clock pulse for delaying a second signal pulse following said first signal pulse by a number of predetermined different time delays, the greatest of said time delays being associated with the greatest spacing between said first of said signal pulses and the first counted clock pulse, and means coupled to said source of clock pulses and responsive to said first of said signal pulses and said delayed second signal pulse for counting the clock pulses between said first signal pulse and said delayed second signal pulse.

8. A system for measuring the time spacing between signal pulses by counting clock pulses comprising a source of clock pulses, a source of signal pulses, means coupled to said source of clock pulses and said source of signal pulses responsive to the time relation between a first of said signal pulses and a time adjacent clock pulse for delaying a second signal pulse following said first signal pulse by a number of predetermined different time delays, the greatest of said time delays being associated with the greatest spacing between said first of said signal pulses and the first counted clock pulse and the smallest of said time delays being associated with the smallest spacing between said first of said signal pulses and the first counted clock pulse, and means coupled to said source of clock pulses and responsive to said first of said signal pulses and said delayed second signal pulse for counting the clock pulses between said first signal pulse and said delayed second signal pulse.

9. A system for measuring the time spacing between signal pulses by counting clock pulses comprising a source of clock pulses, a source of signal pulses, means coupled to said source of clock pulses and said source of signal pulses responsive to the time relation between a first of said signal pulses and a time adjacent clock pulse for delaying a second signal pulse following said first signal pulse by at least a selected one of a number of predetermined different time delays, the greatest of said time delays being associated with the greatest spacing between said first of said signal pulses and the first counted clock pulse, and means coupled to said source of clock pulses and responsive to said first of said signal pulses and the first of said delayed second signal pulses for counting the clock pulses between said first signal pulses and the first of said delayed second signal pulses.

10. A system for measuring the time spacing between signal pulses by counting clock pulses comprising a source of clock pulses, a source of signal pulses, means coupled to said source of clock pulses and said source of signal pulses responsive to the time relation between a first of said signal pulses and a time adjacent clock pulse for delaying a second signal pulse following said first signal pulse by at least a selected one of a number of predetermined different time delays, the greatest of said time delays being associated with the greatest spacing between said first of said signal pulses and the first counted clock pulse and the smallest of said time delays being associated with the smallest spacing between said first of said signal pulses and the first counted clock pulse, and means coupled to said source of clock pulses and responsive to said first of said signal pulses and the first of said delayed second signal pulses for counting the clock pulses between said first signal pulse and the first of said delayed second signal pulses.

11. A system for measuring the time spacing between signal pulses by counting clock pulses comprising a source of clock pulses having a given time interval therebetween, a source of sequential signal pulses, means coupled to said source of signal pulses responsive to said clock pulses and a first pulse of said signal pulses to determine the time position of said first pulse in one of said time intervals and to select at least one of a number of predetermined time delays in accordance with the determined time position in said time interval for delaying a following signal pulse said selected amount and means coupled to said source of clock pulses and responsive to said first of said signal pulses and the first of the delayed signal pulses for counting the clock pulses between said first of said signal pulses and the first of said delayed signal pulses.

12. A system for measuring the time spacing between signal pulses by counting clock pulses comprising a source of clock pulses having a given time interval therebetween, means responsive to said clock pulses to provide vernier timed for occurrence in each of a plurality of subdivisions of said time interval, a source of sequential signal pulses, means responsive to a first of said signal pulses and at least one of said vernier pulses to determine the subdivision in which said first of said signal pulses occurs and to select at least one of a number of predetermined time delays in accordance with the determined subdivision for delaying a following signal pulse said selected amount, and means coupled to said source of clock pulses and responsive to said first of said signal pulses and the first of said delayed signal pulses for counting the clock pulses between said first of said signal pulses and the first of said delayed signal pulses.

13. A system for measuring the time spacing between pulses of pulse pairs by counting clock pulses comprising a source of clock pulses, a source of pulse pairs, means coupled to said source of clock pulses and said source of signal pulses responsive to the time relation between the first pulse of said pulse pairs and a time adjacent clock pulse for delaying the second pulse of said pulse pairs by at least one of a number of predetermined amounts, and means coupled to said source of clock pulses and responsive to said first pulse and the first of said delayed second pulses for counting the clock pulses between said first pulse and the first of said delayed second pulses.

14. A system for measuring the time spacing between the pulses of pulse pairs by counting clock pulses comprising a source of clock pulses having a given time interval therebetween, a source of pulse pairs, means coupled to said source of pulse pairs responsive to said clock pulses and the first pulse of said pulse pairs to determine the time position of said first pulse in one of said time intervals and to select at least one of a number of predetermined time delays in accordance with the determined time position in said time interval for delayng the second pulse of said pulse pair said selected amount, and means coupled to said source of clock pulses and responsive to said first pulse and the first of said delayed second pulses for counting the clock pulses between said first pulse and the first of said delayed second pulses.

15. A system for measuring the time spacing between the pulses of pulse pairs by counting clock pulses comprising a source of clock pulses having a given time interval therebetween, a source of pulse pairs, the timing of said pulse pairs being in a random relationship with respect to the timing of said clock pulses, means coupled to said source of pulse pairs responsive to said clock pulses and the first pulse of said pulse pair to determine the time position of said first pulse in one of said time intervals and to select at least one of a number of predetermined time delays in accordance with the determined time position in said time interval for delaying the second pulse of said pulse pair said selected amount, and means coupled to said source of clock pulses and responsive to said first pulse and the first of said delayed second pulses for counting the clock pulses between said first pulse and the first of said delayed second pulses.

16. A system for measuring the time spacing between the pulses of pulse pairs by counting clock pulses comprising a source of clock pulses having a given time interval therebetween, means responsive to said clock pulses to provide vernier pulses timed for occurrence in each of a plurality of subdivisions of said time interval, a source of pulse pairs, means responsive to the first pulse of said pulse pairs and at least one of said vernier pulses to determine the subdivision in which said first pulse occurs and to select at least one of a number of predetermined time delays in accordance with the determined subdivision for delaying the second pulse of said pulse pairs said selected amount, and means coupled to said source of clock pulses and responsive to said first pulse and the first of said delayed second pulses for counting the clock pulses between said first pulse and the first of said delayed second pulses.

17. A system for measuring the time spacing between the pulses of pulse pairs by counting clock pulses comprising a source of clock pulses having a given time interval therebetween, means responsive to said clock pulses to provide vernier pulses timed for occurence in each of a plurality of subdivisions of said time interval, a source of pulse pairs, the timing of said pulse pairs being in a random relationship with respect to the timing of said clock pulses, means responsive to the first pulse of said pulse pairs and at least one of said vernier pulses to determine the subdivision in which said first pulse occurs and to select at least one of a number of predetermined time delays in accordance with the determined subdivision for delaying the second pulse of said pulse pairs said selected amount, and means coupled to said source of clock pulses and responsive to said first pulse and the first of said delayed second pulses for counting the clock pulses between said first pulse and the first of said delayed second pulses.

18. A system for measuring the time spacing between the pulses of pulse pairs by counting clock pulses comprising a source of clock pulses, a source of pulse pairs, channeling means having a plurality of normally nonconductive paths therethrough, means coupled to said source of pulse pairs to delay the second pulse of said pulse pairs a plurality of different predetermined amounts, means coupled to the last mentioned means to couple each of the delayed second pulses to predetermined ones of said paths, means coupled to said source of clock pulses to sequentially couple each of said clock pulses to each of said paths, means coupled to said source of pulse pairs to couple the first pulse of said pulse pairs simultaneously to said paths, the time coincidence of said clock pulse and said first pulse rendering at least one of said paths conductive to thereby pass at least a given one of said delayed second pulses to the output of said channeling means and means coupled to said source of clock pulses and responsive to said first pulse and the first output pulse of said channeling means for counting the clock pulses between said first pulse and the first output pulse of said channeling means.

19. A system for measuring the time spacing between the pulses of a pulse pair by counting clock pulses comprising a source of clock pulses, a source of pulse pairs, channeling means including a plurality of normally nonconductive paths, an input for each of said paths and a common output for each of said paths, means coupled to said source of pulse pairs responsive to the second pulse of said pulse pairs to provide a plurality of pulses at the output thereof each delayed a different amount with respect to the time position of said second pulse, means coupled to the last mentioned means to couple each of the delayed output pulses therefrom to the input of a different one of said paths, said delayed output pulse having the largest amount of delay being coupled to the first of said paths and said delayed output pulse having the smallest amount of delay being coupled to the last of said paths, means coupled to said source of clock pulses to sequentially couple each of said clock pulses to each of said paths from said first of said paths to said last of said paths, means coupled to said source of pulse pairs to couple the first pulse of said pulse pairs simultaneously to said paths, the time coincidence of said clock pulse and said first pulse rendering at least one of said paths conductive to thereby pass at least one of said delayed output pulses to the common output of said paths, and means coupled to said source of clock pulses and responsive to said first pulse and the first of the delayed output pulses at said common output for counting the clock pulses between said first pulse and said first of the delayed output pulses.

20. A system for measuring the time spacing between the pulses of a pulse pair by counting clock pulses comprising a source of clock pulses, a source of pulse pairs, a plurality of signal channels each including a first coincidence device, a second coincidence device and a bistable device normally in the condition of no output coupled between said first and second coincidence devices, a first delay line coupled to said source of pulse pairs responsive to the second pulse of said pulse pairs, said first delay line having a plurality of output taps spaced therealong to provide a plurality of output pulses each having a different predetermined time delay with respect to the time position of said second pulse, the time delay of the output pulses of said first delay line increasing successively from the first of said output taps to the last of said output taps, means coupling each of the output taps of said first delay line in successive order of pulse delays to said second coincident device of successive ones of said channels, the last of the output taps of said first delay line being coupled to the first of said channels, a second delay line coupled to said source of clock pulses, said second delay line having a time delay equal to the time interval between adjacent clock pulses and a plurality of output taps therealong having an equal time spacing therebetween to delay each of said clock pulses for occurrence in a different subdivision of said time interval, means coupling each of the output taps of said second delay line in successive order of pulse delays to said first coincidence device of successive ones of said channels, the first of the output taps of said second delay line being coupled to the first of said channels, means coupled to said source of pulse pairs to couple the first pulse of said pulse pairs simultaneously to each of said first coincident devices of said channels, the time coincidence of said first pulse and said delayed clock pulses in said first coincident device of at least one of said channels rendering said first coincident devices conductive, the conduction of said first coincident device triggering said bistable device coupled thereto to its condition of output to condition said second coincidence device coupled thereto to pass the delayed output pulses of said first delay line coupled to said conditioned second coincidence device to the output of said channels and means coupled to said source of clock pulses and responsive to said first pulse and the output pulse of said channels for counting the clock pulses between said first pulse and the output pulse of said channels.

No references cited.